(12) United States Patent
Mani et al.

(10) Patent No.: US 7,377,155 B2
(45) Date of Patent: May 27, 2008

(54) METHOD FOR APPROXIMATING TIRE FLAT SPOT DECAY AND MAGNITUDE USING REGRESSIVE ANALYSIS

(75) Inventors: Neel K. Mani, Stow, OH (US); David A. Johnson, Wadsworth, OH (US); Michael A. Berzins, Brecksville, OH (US); Gregg Rasor, Cuyahoga Falls, OH (US)

(73) Assignee: Bridgestone Firestone North American Tire, LLC, Nashville, TN (US)

(*) Notice: Subject to any disclaimer, the term of this patent is extended or adjusted under 35 U.S.C. 154(b) by 437 days.

(21) Appl. No.: 11/238,448

(22) Filed: Sep. 29, 2005

(65) Prior Publication Data

US 2007/0083346 A1 Apr. 12, 2007

(51) Int. Cl.
*G01M 17/02* (2006.01)
(52) U.S. Cl. .......................................... 73/146; 152/527
(58) Field of Classification Search .................. 73/146; 152/527
See application file for complete search history.

(56) References Cited

U.S. PATENT DOCUMENTS

| | | | |
|---|---|---|---|
| 3,150,435 A | 9/1964 | McColm et al. | 28/76 |
| 3,160,192 A | 12/1964 | Drew | 152/355 |
| 5,420,203 A | 5/1995 | Dillman et al. | 525/98 |
| 5,817,197 A * | 10/1998 | Mani | 152/199 |
| 6,029,725 A * | 2/2000 | Mani | 152/197 |
| 6,349,587 B1 * | 2/2002 | Mani et al. | 73/9 |
| 6,435,239 B1 * | 8/2002 | Mani et al. | 152/541 |
| 6,475,316 B1 | 11/2002 | Kirk et al. | 156/82 |
| 6,732,776 B2 * | 5/2004 | Mani et al. | 152/541 |
| 2005/0121128 A1 * | 6/2005 | Yoshimi et al. | 152/527 |
| 2007/0006957 A1 * | 1/2007 | Nakajima | 152/527 |

OTHER PUBLICATIONS

Great Britain Patent No. 1,110,385 published Apr. 18, 1968 by the Monsanto Company.

* cited by examiner

*Primary Examiner*—Andre J Allen
(74) *Attorney, Agent, or Firm*—James R. Cartiglia; Thomas R. Kingsbury

(57) ABSTRACT

An improved method for determining an initial flat spot magnitude on a tire that has been resting for a period of time on a substantially flat surface uses regression analysis. In accordance with the method, values of a tire flat spot magnitude for a particular type of tire are determined at a number of measurement intervals by a uniformity machine that spins the tire. An equation having at least two exponentially decaying terms is then determined that corresponds to the measured data points. Regression analysis is then used to determine an estimate for an initial flat spot magnitude. The method can be used to evaluate the effectiveness of different tire designs with respect to flat spot recovery rates.

23 Claims, 4 Drawing Sheets

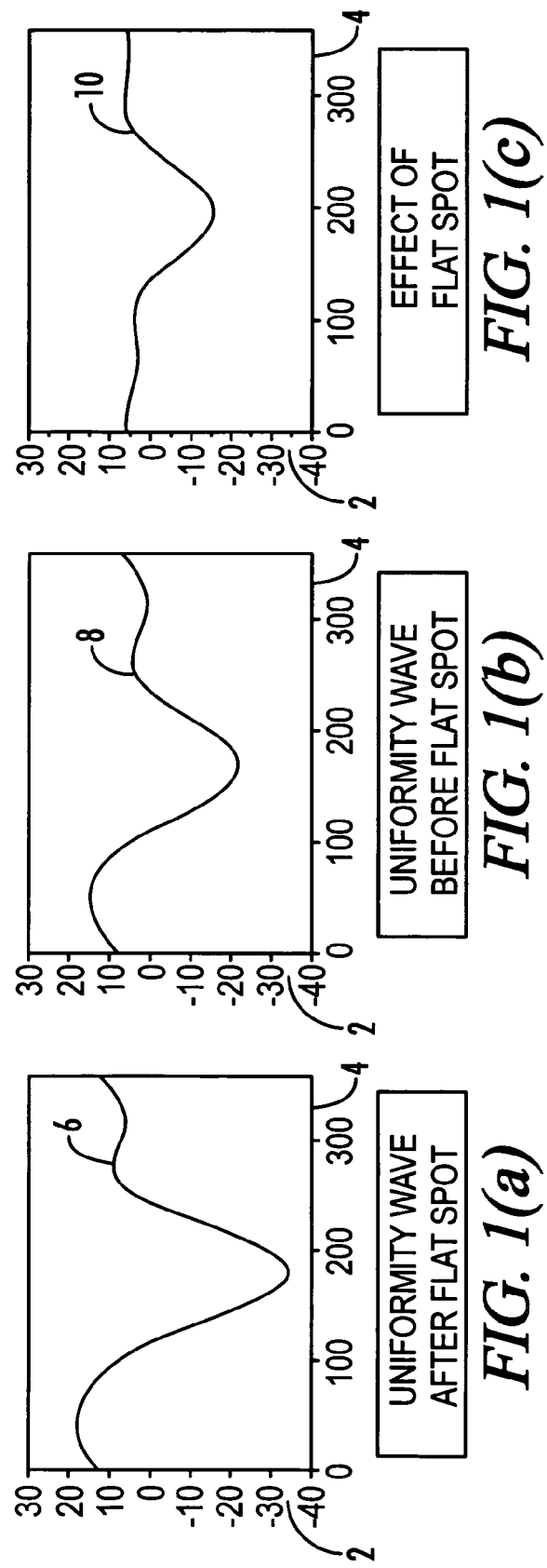

METHOD FOR APPROXIMATING TIRE FLAT SPOT DECAY AND MAGNITUDE USING REGRESSIVE ANALYSIS

BACKGROUND OF THE INVENTION

The tires of an automobile that has been parked for a period of time form flat spots where they come into contact with the hard surface on which the automobile is parked. Later, when the automobile is started and begins to travel, the flat spot remains for a period of time before the tire returns to its normal, substantially round shape. During this period, the vehicle could experience sometimes severe vibrations as the flat spot is repeatedly and forcefully brought into contact with the road surface upon which the vehicle is being operated. These vibrations may be harmful to the automobile and uncomfortable for the driver. In order to diminish these deleterious effects, tire manufacturers try to build tires which either form smaller flat spots or return to their round shape as rapidly as possible.

In order to design tires which minimize the adverse effects of the flat spot phenomenon, a method for determining the rate at which the flat spot disappears or decays is needed so that tires can be classified according to their flat spot performance. Currently, a uniformity machine is used to measure the decay of a flat spot on a tire. Unfortunately, a uniformity machine must spin a tire for a short period of time, during which the flat spot decays, before it can measure the initial magnitude of the flat spot and its rate of decay. Thus, a uniformity machine can not accurately measure the magnitude of decay of a flat spot during the initial period of rotation. Therefore, what is needed is an improved method of determining the initial flat spot magnitude and the rate of decay of the flat spot at any given period during tire use.

BRIEF SUMMARY OF THE INVENTION

An embodiment of the present invention is directed toward a method of modeling the decay of a flat spot on a tire once the tire begins to roll. In accordance with the method, a set of flat spot uniformity values is experimentally determined. Regression analysis is then used to conform an equation to the set of experimentally determined flat spot uniformity values. The equation has at least two exponentially decaying terms that are of the form $e^{-bt}$ wherein b represents a decay constant and t represents time. Most preferably, the equation is of the form $y=ae^{-bt}+ce^{-dt}+f$ where f is the asymptotic value approached as time, t, approaches infinity, a is the initial magnitude of a first decay term having a decay constant of b, and c is the initial magnitude of a second decay term having a decay constant of d. t=0 is selected to correspond to a time when the tire begins to roll. One of the two decay terms corresponds to a decay rate for one component of the tire, such as the cords in the tire, and the other corresponds to a decay rate for a second component of the tire, such as the rubber used in the tire.

Another embodiment of the present invention is directed toward a method of estimating a magnitude of a flat spot produced on a tire as a result of the tire resting on a substantially flat surface, as a function of time. In accordance with the embodiment, a magnitude of the flat spot is measured during a set of measurement intervals after the tire has begun rolling to obtain a set of experimental measurements. A uniformity machine may be used to measure the magnitude of the flat spot at the measurement intervals. To accurately set the radial load of the tire and the speed of rotation, the uniformity machine rolls the tire for a period of time, such as 15 seconds, prior to measuring a magnitude of the flat spot. An equation is then derived that approximately expresses the flat spot size as a function of time and is in conformance with the set of experimental measurements. The equation includes two exponentially decaying terms of the form $ae^{-bt}$ where a and b are constants and t represents time. Most preferably, the equation is of the form $y=ae^{-bt}+ce^{-dt}+f$ where f is the asymptotic value approached as time, t, approaches infinity, a is the initial magnitude of a first decay term having a decay constant of b, and c is the initial magnitude of a second decay term having a decay constant of d. One of the decay terms corresponds to a creep rate of a first tire component, such as rubber, used in the tire and the other of the decay terms corresponds to a creep rate of a second tire component, such as a cord. Regression analysis is performed to extrapolate the equation to time=0 and determine an initial magnitude of the flat spot prior to the tire rolling.

Yet another embodiment of the present invention is directed toward a device for determining a magnitude of a flat spot created on a tire after the tire has rested on a substantially flat surface for an interval of time. The device includes measuring means for determining the flat spot magnitude at a number of measurement intervals wherein the measuring means only determine the flat spot magnitude value when the tire is rolling. Processing means determine an equation that expresses the flat spot size as function of time. The processing means use regression analysis to determine an approximate magnitude of the flat spot prior to the tire rolling. The equation corresponds to the measured values of the flat spot magnitude and has at least two exponentially decaying terms. One of the exponentially decaying terms corresponds to a creep rate of a tire component such as rubber and the other of the exponentially decaying terms corresponds to a creep rate of a second tire component such as a cord. The equation is preferably of the form $y=ae^{-bt}+ce^{-dt}+f$ where f is the asymptotic value approached as time, t, approaches infinity, a is the initial magnitude of a first decay term having a decay constant of b, and c is the initial magnitude of a second decay term having a decay constant of d. The magnitude of the flat spot prior to the tire rolling is equal to the sum of a, c and f. A display displays the determined flat spot magnitude and the derived equation.

BRIEF DESCRIPTION OF THE DRAWINGS

FIGS. 1(a-c) are graphs depicting tire radial run out versus angle of rotation for a tire having a flat spot;

DETAILED DESCRIPTION OF THE INVENTION

Figure 2B:
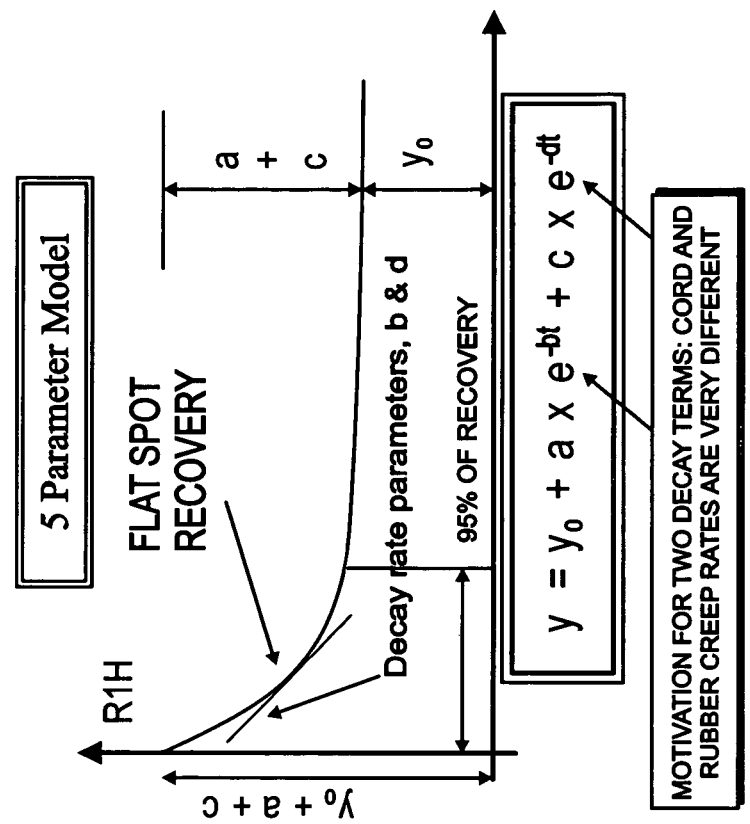
FIGS. 2 (a) and (b) are graphs of a flat spot recovery curve created using a three parameter model and a five parameter model in accordance with an embodiment of the present invention.

The present invention uses modeling to help determine the performance of a tire with respect to the formation and decay of a flat spot formed on a tire. The flat spot, which is created when the tire rests against a surface, begins to decay once the tire begins to rotate. Although a flat spot can be formed by placing a tire into contact with any surface, a substantially flat surface is typically used for analysis purposes. In order to model the performance of a tire with respect to flat spots, measurements of the flat spot's magnitude and decay must be taken. These measurements are typically taken with a device known as a uniformity machine. A uniformity machine essentially measures the roundness of a tire when rotating against a flat surface and produces a graph that shows the value of the radial force variation when the tire rolls on the y-axis with respect to an angle of rotation on the x-axis. The magnitude of a flat spot is typically expressed in terms of pounds or Newtons of radial force.

Uniformity machine measurements must be taken under specified conditions in order for the results of one set of tests to be comparable to those of another set of tests. To prepare for a test, the following steps are typically performed: (1) the tire to be tested is mounted on the uniformity machine (2) the tire is balanced on the uniformity machine (3) the tire is inflated to a predetermined inflation (4) the load on the tire is set and (5) the tire is rotated for a predetermined amount of time to warm up the tire and (6) uniformity data is collected. A typical run time for such a uniformity test is about 30 minutes. The data collected during these preparations for the flat spot uniformity test are used to produce a graph such as shown in FIG. 1(b) which represents the uniformity of the tire prior to having an induced flat spot.

Once the initial tire data need to produce FIG. 1(b) has been obtained, the tire is tested with an induced flat spot to produce the graph of FIG. 1(a). To create a flat spot, the tire is loaded into a chuck that applies a constant load to the tire for a predetermined period of time that ranges from about 1 to 72 hours. Once the flat spot has been created, the tire is again tested using the uniformity machine. If desired, the test may be performed multiple times with different loads and speeds. However, unless the test conditions for two separate tests are very similar, the results from one test can not be compared to the results from a second test. Nevertheless, parameters such as temperature can be altered to test a particular tire's performance in simulated summer or winter conditions.

Since no tire is perfectly round, an initial uniformity measurement of the tire without any induced flat spot is taken. An exemplary such reading is depicted in FIG. 1(b) wherein the tires angle of rotation 4 in degrees is plotted on the x-axis and the radial force 2 of the tire in pounds or Newtons is plotted on the y-axis. As shown in the uniformity wave 8 of FIG. 1(b), the tire already deviates from an ideal roundness value represented by value 0 on the y-axis without an induced flat spot. FIG. 1(a) illustrates a uniformity wave 6 for the tire of FIG. 1(b) with an induced flat spot. The non-uniformity of the tire is proportional to the magnitude of the flat spot. Thus, the uniformity of the tire as it spins has decreased as a result of the flat spot. This decreased uniformity is indicated by the increased deviance of the uniformity wave 6 from the expected value or ideal value. To determine the effect on the uniformity wave 6 that is a result of the flat spot, the uniformity wave 8 of FIG. 1(b) is subtracted from the uniformity wave 6 of FIG. 1(a). The result is the uniformity wave 10 of FIG. 1(c) which illustrates the effect of the flat spot on the tire's rotation. Unfortunately, the tire must be spinning at a fairly constant rate for the uniformity machine to produce an accurate uniformity wave and rotating the tire immediately causes the flat spot to begin decaying. Therefore, a uniformity machine is not capable of measuring a flat spot prior to any decay occurring as a result of the tire being rotated.

Another problem that results from the use of a uniformity machine is due to the fact that the uniformity of the tire is altered by the tire being rotated for a period of time. To compensate for this alteration in the tire's uniformity due to the effects of rotation, the uniformity of the tire may be measured during each of a number of measurement intervals while being rotated without a flat spot. Then, once the tire has been flat spotted and is being run to decay the flat spot, the initial uniformity measurements taken during the previous intervals of time are subtracted from the measurements taken during corresponding intervals with the flat spot present. This procedure compensates for any changes that occur in the tire's uniformity while it is being rotated that are not a result of the flat spot's decay.

Figure 2A:
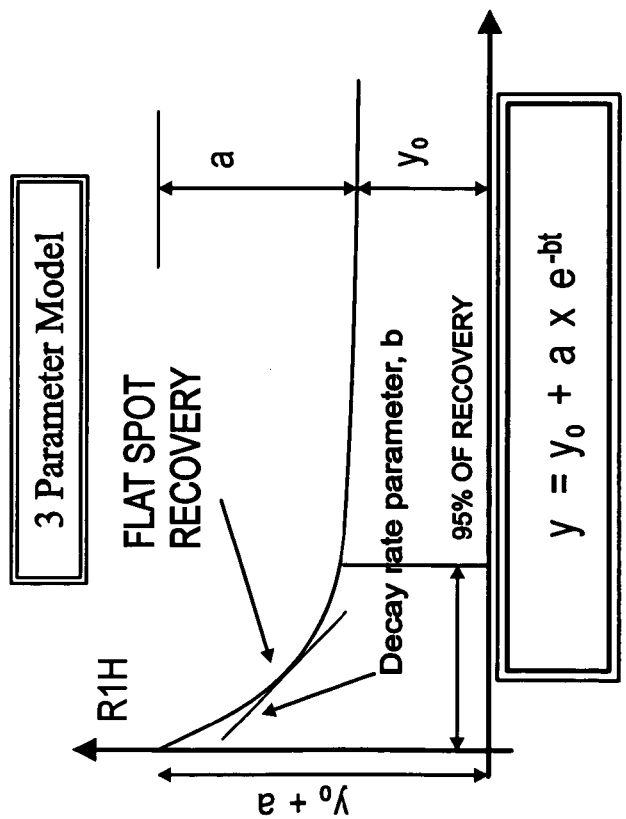

To obtain initial flat spot measurements for tires, regression analysis equations that express the flat spot's magnitude as a function of time are fit to sets of experimentally obtained data points. These equations can then be used to extrapolate the experimental data to the point in time before the flat spot decayed which is usually taken to be time zero. A three parameter model has the form set forth in equation (1):

$$y = ae^{-bt} + c \qquad (1)$$

where c is the asymptotic value approached as time, t, approaches infinity, a is the magnitude of y that decays and b is the decay constant. Since there is only one exponential term, there is a single rate of decay for this function. An exemplary graph for such a three parameter equation is shown in FIG. 2(a).

The present inventor has discovered that a five parameter model having the form set forth below in equation (2) more accurately predicts the decay of a tire flat spot and the flat spot's initial value:

$$y = ae^{-bt} + ce^{-dt} + f \qquad (2)$$

where f is the asymptotic value approached as time, t, approaches infinity, a is the initial magnitude of a first decay term having a decay constant of b, and c is the initial magnitude of a second decay term having a decay constant of d. An exemplary graph for such a five parameter equation is shown in FIG. 2(b).

In the five parameter model of equation (2), there are two decay terms a and c and, therefore, two rates of exponential decay. When a flat spotted tire recovers, the two primary decay rates involved are primarily due to the fact that the rubber and the cords, which are typically nylon and polyester, decay at different rates due to the material's different creep rates. Therefore, the five parameter model of equation (2) more accurately represents flat spot decay than the three parameter model of equation (1).

As discussed above, when a flat spotted tire rolls, the flat spot's decay begins as soon as the tire begins to rotate. However, a uniformity machine must roll a tire for period of time before it can collect any flat spot decay data. This delay is unavoidable because the uniformity machine has to set the proper test conditions, including tire rotation speed, and during this time, the flat spot is decaying from its initial value. When one wants to characterize a tire for flat spotting, the initial magnitude of the flat spot is important. Since data is only available after approximately a minute of rolling, a regression function is used to extrapolate the measured data back to the point prior to the tire beginning to roll or when time=0. The present inventors have discovered that using the five parameter model of equation (2) much more accurately estimates the initial flat spot magnitude than the 3 parameter model of equation (1).

Figure 3:
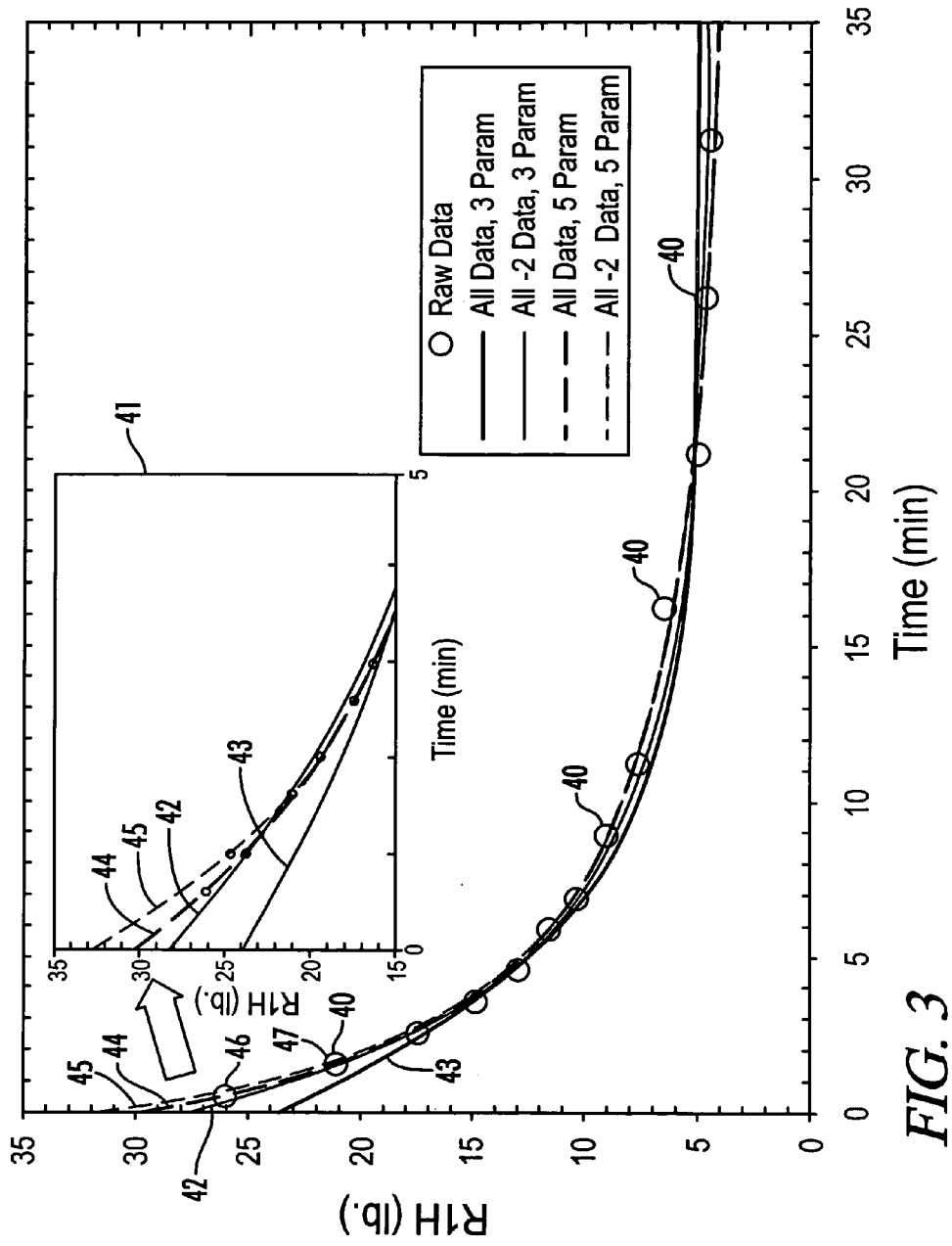
FIG. 3 is a graph showing the relationship between experimental flat spot data and three and five parameter curve fits in accordance with an embodiment of the present invention.

The superiority of the five parameter modeling equation is illustrated in FIG. 3. In the figure, the time in minutes is displayed on the x-axis and the flat spot magnitude in pounds or Newtons is displayed on the y-axis. Raw flat spot data that is experimentally determined for times subsequent to the initial rotation of the tire using a test set up such as the uniformity machine discussed above is represented in FIG. 3 by circles 40. Once the raw data points 40 have been obtained, regression analysis is applied to the raw data points 40 to determine to determine an equation that approximates a curve drawn through the data points 40. A three parameter equation having the form $y=ae^{-bt}+c$ that has been fit to the data points is shown by line 42 in FIG. 3. The various values of the parameters in the three parameter equation can be determined by substituting in at least three experimentally determined values of x and y and solving for a, b and c. In FIG. 3, c is approximately 5 and a is approximately 23 for the line 42. As shown in FIG. 3, line 42 provides a fairly good approximation of the data points 40 after five minutes have elapsed but does deviate along some portions of the curve. In particular, the three parameter equation represented by line 42 deviates the most from the data points 40 when the time is less than five minutes as shown in the close up of box 41.

The three parameter equation graph 42 predicts an initial flat spot value of approximately 28. In contrast, when a five parameter equation of the form $y=ae^{-bt}+ce^{-dt}+f$, is conformed to the data points 40, the curve 44 results. As shown in FIG. 3, curve 44 much more closely coincides with the data points 40. In addition, curve 44 predicts an initial flat spot magnitude of 30 while curve 42 predicts an initial flat spot magnitude of 28. As discussed in more detail below, the present inventors have determined that the five parameter equation 44 is more accurate in predicting initial flat spot magnitudes than the three parameter equation 42.

Since it is not possible to measure the initial flat spot magnitude with a uniformity machine prior to rotating the tire, it is difficult to know which equation best predicts the initial flat spot magnitude. However, if a uniformity machine takes more time than normal to set the load, the flat spot will have decayed and the first data point will be taken later than normal. To simulate such a situation and to test the accuracy of the three and five parameter models, the all data—2 lines 43 and 45 in FIG. 3 were graphed by dropping the first two measured data points 46 and 47 and then performing the three and five parameter regression analysis on the remaining data points to see which equation most accurately predicts the first two measured data points. As can be seen in FIG. 3, when the first two data points 46 and 47 are dropped, the five parameter model, represented by line 45, much more accurately predicts the first two data points 46 and 47 than the three parameter model, represented by line 43. Thus, the five parameter model is more accurate in predicting initial flat spot magnitude than the three parameter model.

Although the five parameter equation is preferred, a seven or nine parameter equation of the form set forth above having a third and/or fourth decay term could be employed in situations where additional accuracy was required. In such a case, the same method as described above would be used to determine the equation constants and regression analysis performed to determine the initial values.

Figure 4:
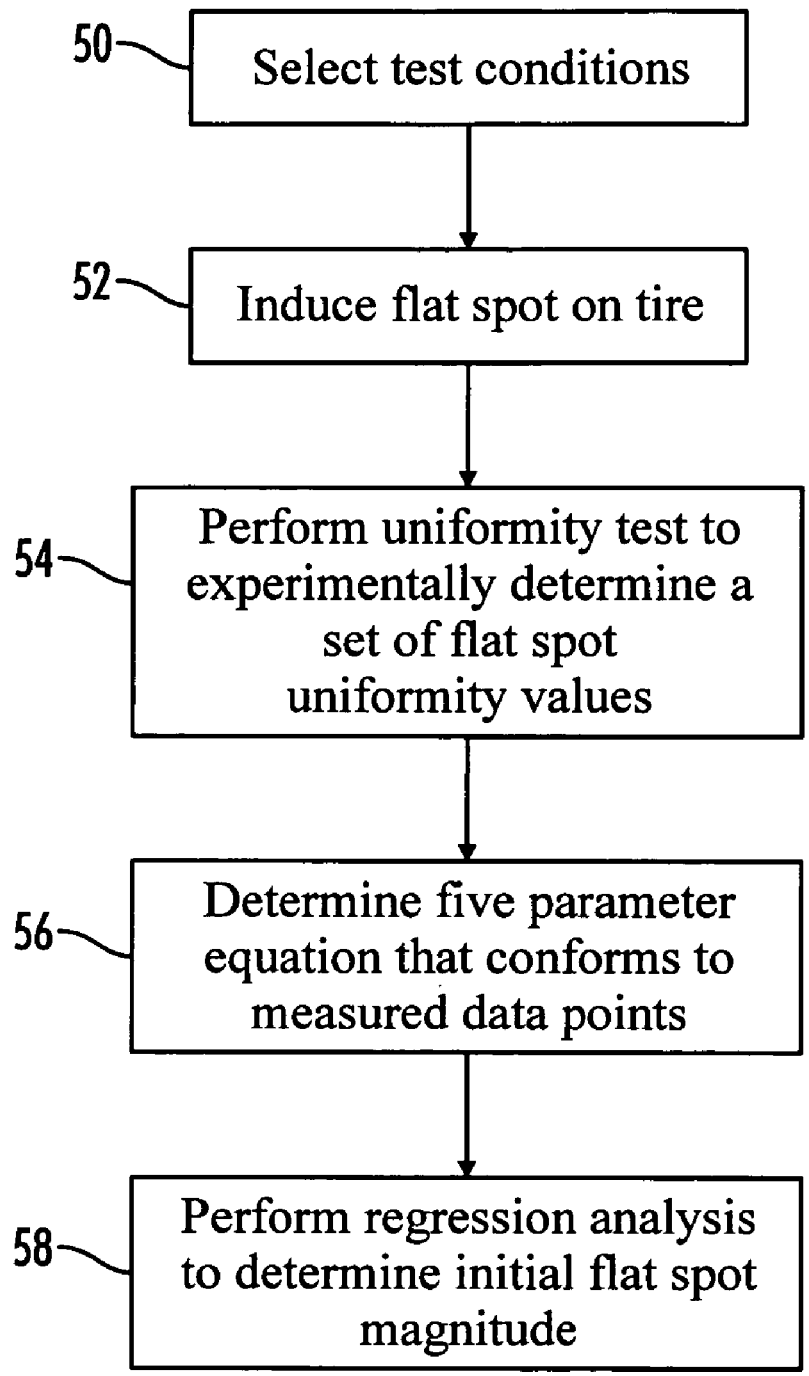
FIG. 4 is a block diagram of a method of determining an initial flat spot magnitude in accordance with an embodiment of the present invention.

Referring now to FIG. 4, a flow chart of a method of determining an initial flat spot magnitude in accordance with an embodiment of the present invention is shown. The method begins in block 50 with the selection of a set of test conditions. As discussed above, temperature, load, time spent under load creating the flat spot and a variety of other factors influence the rate of flat spot formation and decay. Therefore, in order for the test results to be useful in making comparisons between tires, the test conditions need to be carefully managed. Once the test conditions are set, a flat spot is induced on the tire under test in accordance with the set conditions in step 52. A uniformity test is then performed on the tire to experimentally determine a set of flat spot uniformity values in step 54. In step 56, a five parameter equation of the form $y=ae^{-bt}+ce^{-dt}+f$ that conforms to the measured data points is determined as set forth in more detail above. Finally, in step 58, regression analysis is performed to determine an initial flat spot magnitude. This magnitude can then be used to categorize the tire's flat spot performance.

Although there have been described particular embodiments of the present invention of a new and useful METHOD FOR APPROXIMATING TIRE FLAT SPOT DECAY AND MAGNITUDE USING REGRESSIVE ANALYSIS, it is not intended that such references be construed as limitations upon the scope of this invention except as set forth in the following claims.

What is claimed is:

1. A method of modeling decay of a flat spot on a tire once said tire begins roll, said method comprising:
   experimentally determining a set of flat spot uniformity values; and
   using regressive analysis to conform an equation to said set of flat spot uniformity values wherein said equation has at least two exponentially decaying terms.

2. The method of claim 1 wherein said exponentially decaying terms are of the form $e^{-bt}$ wherein b represents a decay constant and t represents time.

3. The method of claim 1 wherein said equation is of the form $y=ae^{-bt}+ce^{-dt}+f$ where f is the asymptotic value approached as time, t, approaches infinity, a is the magnitude of a first decay having a decay constant of b, and c is the magnitude of a second decay having a decay constant of d.

4. The method of claim 3 wherein t=0 corresponds to a time when said tire begins to roll.

5. The method of claim 1 wherein one of said two decay terms corresponds to a decay rate for a cord used in said tire.

6. The method of claim 1 wherein one of said two decay terms corresponds to a decay rate for a rubber used in said tire.

7. A method of estimating a magnitude of a flat spot produced on a tire as a result of the tire resting on a surface as a function of time, said method comprising:
   measuring a size of said flat spot during a set of measurement intervals after said tire has begun rolling to obtain a set of experimental measurements; and
   deriving an equation that approximately expresses said flat spot magnitude as a function of time and is in conformance with said set of experimental measurements;
   wherein said equation includes two exponentially decaying terms.

8. The method of claim 7 wherein said exponentially decaying terms are of the form $ae^{-bt}$ where a and b are constants and t represents time.

9. The method of claim 7 further comprising performing regression analysis to extrapolate said equation to determine an initial magnitude of said flat spot prior to said tire rolling.

10. The method of claim 7 wherein said equation is of the form $y=ae^{-bt}+ce^{-dt}+f$ where f is the asymptotic value approached as time, t, approaches infinity, a is the magnitude of a first decay having a decay constant of b, and c is the magnitude of a second decay having a decay constant of d.

11. The method of claim 7 further comprising the step of compensating for rotational changes in said tire's uniformity by measuring a set of tire uniformity values during a set of time intervals when the tire is rotating without a flat spot and subtracting said measured uniformity values from uniformity values measured during corresponding time intervals when said tire is being rotated with a flat spot.

12. The method of claim 7 wherein one of said decay terms is predominantly determined by a creep rate of a rubber used in said tire and the other of said decay terms is predominantly determined by a creep rate of a cord used in said tire.

13. The method of claim 7 wherein measuring a magnitude of said flat spot comprises using uniformity machine to measure a magnitude of said flat spot at said measurement intervals.

14. The method of claim 7 wherein said uniformity machine rolls said tire for at least 15 seconds prior to measuring a magnitude of said flat spot.

15. A device for determining a magnitude of flat spot created on a tire after said tire has rested on a surface for an interval of time, said device comprising:
  measuring means for determining a flat spot magnitude value at a number of measurement intervals wherein said measuring means only determine said flat spot magnitude value when said tire is rolling; and
  processing means for determining an equation that expresses said flat spot magnitude as a function of time wherein said equation corresponds to said measured values of said flat spot magnitude and wherein said equation has at least two exponentially decaying terms.

16. The device of claim 15 wherein said processing means use regression analysis to determine an approximate magnitude of said flat spot prior to said tire rolling.

17. The device of claim 15 further comprising a display for displaying said measured flat spot magnitude values and said equation.

18. The device of claim 15 wherein said equation is of the form $y=ae^{-bt}+ce^{-dt}+f$ where f is the asymptotic value approached as time, t, approaches infinity, a is the initial magnitude of a first decay term having a decay constant of b, and c is the initial magnitude of a second decay term having a decay constant of d.

19. The device of claim 18 wherein a magnitude of said flat spot prior to said tire rolling is equal to the sum of a, c and f.

20. The device of claim 15 wherein said exponentially decaying terms are of the form $ae^{-bt}$ where a and b are constants and t represents time.

21. The device of claim 15 wherein one of said exponentially decaying terms predominantly corresponds to a creep rate of a rubber used in said tire and the other of said exponentially decaying terms corresponds to a creep rate of a cord used in said tire.

22. The device of claim 15 wherein said measuring means compensate for changes in uniformity of said tire that occur when said tire is rotated by measuring a first uniformity value of said tire when said tire is rotating without a flat spot and subtracting said first measured value from a second uniformity value measured when said tire is rotating with a flat spot.

23. A method of determining an initial flat spot magnitude, said method comprising the steps of:
  selecting a set of test conditions;
  inducing formation of a flat spot on a tire;
  performing a uniformity test to determine a set of measured flat spot uniformity values;
  determining a five parameter equation having at least two decay terms that conforms to the measured flat spot uniformity values; and
  performing regression analysis to determine an initial flat spot magnitude.

* * * * *